(12) United States Patent
Hieda

(10) Patent No.: US 9,440,645 B2
(45) Date of Patent: Sep. 13, 2016

(54) TRACTION CONTROL SYSTEM AND SADDLED VEHICLE

(71) Applicant: YAMAHA HATSUDOKI KABUSHIKI KAISHA, Iwata (JP)

(72) Inventor: Kazuya Hieda, Iwata (JP)

(73) Assignee: YAMAHA HATSUDOKI KABUSHIKI KAISHA, Shizuoka-Ken Iwata-Shi (JP)

( * ) Notice: Subject to any disclaimer, the term of this patent is extended or adjusted under 35 U.S.C. 154(b) by 0 days.

(21) Appl. No.: 14/566,698

(22) Filed: Dec. 10, 2014

(65) Prior Publication Data
US 2016/0059850 A1  Mar. 3, 2016

(30) Foreign Application Priority Data

Sep. 3, 2014 (JP) .................................. 2014-179160

(51) Int. Cl.
*B60W 30/00* (2006.01)
*B60W 40/114* (2012.01)
*B60T 8/17* (2006.01)

(52) U.S. Cl.
CPC ............. *B60W 30/00* (2013.01); *B60T 8/1706* (2013.01); *B60W 40/114* (2013.01)

(58) Field of Classification Search
None
See application file for complete search history.

(56) References Cited

U.S. PATENT DOCUMENTS

| 8,560,173 | B2 * | 10/2013 | Matsuda | B60T 8/1706 280/5.5 |
| 2008/0001478 | A1 * | 1/2008 | Wagner | B60K 28/16 303/191 |
| 2010/0312449 | A1 | 12/2010 | Savaresi et al. | |
| 2014/0019006 | A1 * | 1/2014 | Bruce | B62D 5/0457 701/41 |
| 2014/0046562 | A1 * | 2/2014 | Minami | B60W 10/02 701/67 |
| 2014/0129088 | A1 | 5/2014 | Meissner et al. | |
| 2014/0200780 | A1 * | 7/2014 | Watanabe | B60T 8/1706 701/68 |
| 2015/0274160 | A1 * | 10/2015 | Lee | B62D 6/002 701/41 |

FOREIGN PATENT DOCUMENTS

| DE | 10235378 A1 | 2/2004 |
| DE | 10-2005-003981 A1 | 8/2006 |
| EP | 1769990 A2 | 4/2007 |
| EP | 2738075 A1 | 6/2014 |
| JP | 2000-025599 A | 1/2000 |
| JP | 2001-047996 A | 2/2001 |
| JP | 2004-051091 A | 2/2004 |
| JP | 2005-047314 A | 2/2005 |
| JP | 2005-061376 A | 3/2005 |
| JP | 2008-231990 A | 10/2008 |
| JP | 2009-530177 A | 8/2009 |

(Continued)

OTHER PUBLICATIONS

David Sprinkle, "Traction Control Explained", Apr. 16, 2012, Motorcycle.com, http://www.motorcycle.com/how-to/traction-control-explained-91272.html.*

(Continued)

*Primary Examiner* — Adam Tissot
*Assistant Examiner* — Timothy Nesley
(74) *Attorney, Agent, or Firm* — Rabin & Berdo, P.C.

(57) ABSTRACT

A traction control system according to an embodiment of the present invention includes a yaw rate detector configured to detect the yaw rate of a saddled vehicle, and a controller configured to perform a traction control based on the detected yaw rate.

19 Claims, 7 Drawing Sheets

(56) References Cited

FOREIGN PATENT DOCUMENTS

| JP | 2010-285987 A | 12/2010 |
|---|---|---|
| JP | 2011-099382 A | 5/2011 |
| JP | 2011-152834 | 8/2011 |
| JP | 2011-185107 A | 9/2011 |
| JP | 2013-523532 A | 6/2013 |
| JP | 2013-209047 A | 10/2013 |

OTHER PUBLICATIONS

Extended European Search Report dated Apr. 14, 2015.
Japanese Office Action dated Jun. 30, 2015.
European Office Action dated Nov. 11, 2015.

* cited by examiner (a) CURVE WITH SMALL R (b) CURVE WITH LARGE R

TRACTION CONTROL SYSTEM AND SADDLED VEHICLE

CROSS-REFERENCE TO RELATED APPLICATION

This application is based on Japanese Patent Application No. 2014-179160 filed on Sep. 3, 2014, the entire contents of which are hereby incorporated by reference.

BACKGROUND

1. Technical Field

The present invention relates to a traction control system for a vehicle which banks while rounding a curve and also relates to a saddled vehicle including such a control system.

2. Description of the Related Art

Some people proposed providing a motorcycle with a traction control system which controls the engine power so that predetermined driving force can be obtained with the rear wheel prevented from slipping excessively. In performing the traction control, the rear wheel's slipping is detected and the engine's driving force is reduced according to the magnitude of that slipping, thereby minimizing slipping.

Particularly when driving a motorcycle around a curve, the rider is required to twist the accelerator grip finely. That is why to lighten the rider's operation load, some people say the traction control should work. For example, Japanese Laid-Open Patent Publication No. 2010-285987 teaches changing the slip value to be a threshold value at which the traction control should be started according to the bank angle of a motorcycle.

As long as the motorcycle is running at a small bank angle, the permissible slip value is so large that relatively light operation load is imposed on the rider. For that reason, until the slip value reaches a certain level, there is only a little need to lighten the rider's operation load by performing the traction control. However, if the motorcycle is running at a large bank angle, the permissible slip value is so small that heavy operation load is imposed on the rider. In that case, there is a lot of need to lighten the rider's operation load by performing the traction control when the slip value is still small.

However, the present inventors discovered and confirmed via experiments that just by changing the slip value to be a threshold value at which the traction control should be started according to bank angle so that the threshold slip value becomes small if the bank angle is large but becomes large if the bank angle is small, the rider's operation load could not be lightened sufficiently in some cases. The reason is as follows. Specifically, when a motorcycle is rounding a curve, the magnitude of the bank angle is almost the same irrespective of the radius of curvature R of that curve. Nevertheless, according to the radius of curvature R of the curve, the rider needs to change the accelerator position when entering the latter half of curve, and the rate of increase in slipping, if any, also changes. And if the rate of increase in slipping is high, the traction control should be started as easily as possible. Consequently, the present inventors discovered that there is room for further lightening the rider's operation load by changing the facility to start the traction control according to the radius of curvature R of the curve.

The present invention provides a traction control system which contributes to further lightening the operation load on a rider who is driving a motorcycle around a curve and also provides a saddled vehicle including such a control system.

SUMMARY

A traction control system according to an embodiment of the present invention includes: a yaw rate detector configured to detect the yaw rate of a saddled vehicle; and a controller configured to perform a traction control based on the yaw rate detected.

In one embodiment, the controller may change a slip value to be a threshold value, at which the traction control is turned ON and OFF, according to the yaw rate detected.

In another embodiment, if the yaw rate detected is large, the controller may decrease the threshold slip value, compared to when the yaw rate detected is small.

In another embodiment, the controller may detect the slip value of the saddled vehicle's rear wheel, and if the rear wheel's slip value detected turns out to be equal to or greater than the threshold slip value, the controller may start to perform the traction control.

In another embodiment, the traction control system may further include an accelerator position angle detector configured to detect the accelerator position angle of the saddled vehicle. The controller may change the threshold slip value, at which the traction control is turned ON and OFF, according to the accelerator position angle detected as well.

In another embodiment, if the accelerator position angle detected is large, the controller may increase the threshold slip value, compared to when the accelerator position angle detected is small.

In another embodiment, the controller may reduce the driving force through the traction control to a varying degree according to the yaw rate detected.

In another embodiment, if the yaw rate detected is large, the controller may reduce the driving force more significantly than when the yaw rate detected is small.

In another embodiment, the controller may detect the slip value of the saddled vehicle's rear wheel. The controller may reduce the driving force through the traction control to a varying degree according to the rear wheel's slip value detected as well.

In another embodiment, if the rear wheel's slip value detected is large, the controller may reduce the driving force more significantly than when the rear wheel's slip value detected is small.

In another embodiment, the traction control system may further include a bank angle detector configured to detect the saddled vehicle's bank angle. The controller may reduce the driving force through the traction control to a varying degree according to the bank angle detected as well.

In another embodiment, if the bank angle detected is large, the controller may reduce the driving force more significantly than when the bank angle detected is small.

A saddled vehicle according to an embodiment of the present invention includes a traction control system according to any of the embodiments described above.

A non-transitory computer readable medium storing a computer program according to an embodiment of the present invention is defined to make a computer perform a traction control on a saddled vehicle. The traction control includes the steps of: detecting the saddled vehicle's yaw rate; and performing the traction control according to the yaw rate detected.

A traction control system according to an embodiment of the present invention detects the yaw rate of a saddled vehicle and performs a traction control based on the yaw rate detected, and therefore, can perform a traction control appropriately according to the magnitude of the radius of curvature R of a curve.

In an exemplary embodiment, a slip value to be a threshold value at which the traction control is turned ON and OFF is changed based on the yaw rate detected. According to such an embodiment, the traction control can be started at an appropriate timing according to the magnitude of the radius of curvature R of the curve.

For example, if the yaw rate detected is large, the threshold slip value is decreased compared to when the yaw rate detected is small. If slipping occurs at a curve with a small radius of curvature R, the rate of increase in slipping tends to get high. That is why if the reference slip value is set to be low enough to perform the traction control easily when the rider is driving his or her vehicle around a curve with such a small radius of curvature R, he or she can set the vehicle upright quickly in low gear. In addition, even if he or she changes the accelerator position suddenly, it is still possible to prevent the rate of increase in slipping from going too high.

In another exemplary embodiment, the slip value of the saddled vehicle's rear wheel is detected. And if the rear wheel's slip value detected turns out to be equal to or greater than the threshold slip value, the traction control is started. By using such a threshold slip value that has been set based on the yaw rate, the traction control can be started at an appropriate timing according to the magnitude of the radius of curvature R of the curve.

In still another exemplary embodiment, the threshold slip value, at which the traction control is turned ON and OFF, is changed according to an accelerator position angle detected as well. According to such an embodiment, the system can perform the traction control while meeting the needs of a rider who wants to drive the vehicle with the rear wheel sliding.

For example, if the accelerator position angle detected is large, the threshold slip value is increased compared to when the accelerator position angle detected is small. According to such an embodiment, the system can perform the traction control while meeting the needs of a rider who wants to drive the vehicle with the rear wheel sliding.

In yet another exemplary embodiment, the driving force is reduced through the traction control according to the yaw rate detected. According to such an embodiment, the traction control can be performed appropriately according to the magnitude of the radius of curvature R of a curve.

For example, if the yaw rate detected is large, the driving force is reduced more significantly than when the yaw rate detected is small. If slipping occurs at a curve with a small radius of curvature R, the rate of increase in slipping tends to get high. That is why when the rider is driving his or her vehicle around a curve with such a small radius of curvature R, the driving force is reduced more significantly. Then, the actual slip value can get closer to the reference slip value quickly.

In yet another exemplary embodiment, the driving force is reduced through the traction control to a varying degree according to the yaw rate and rear wheel's slip value that have been detected. According to such an embodiment, the traction control can be performed appropriately according to the magnitude of the radius of curvature R of a curve.

For example, if the rear wheel's slip value detected is large, the driving force is reduced more significantly than when the rear wheel's slip value detected is small. Then, the actual slip value can get closer to the reference slip value quickly.

In yet another exemplary embodiment, the traction control system further includes a bank angle detector configured to detect the saddled vehicle's bank angle, and the driving force is reduced through the traction control to a varying degree according to the bank angle detected as well. According to such an embodiment, the traction control can be performed appropriately according to the bank angle detected.

For example, if the bank angle detected is large, the driving force is reduced more significantly than when the bank angle detected is small. By changing the timing to start the traction control according to the bank angle, slipping can be reduced. However, if the control gain remained the same no matter whether the bank angle is large or small, slipping could not be reduced sufficiently when the bank angle is large and could be reduced excessively when the bank angle is small. That is why if the control gain is increased when the bank angle is large and decreased when the bank angle is small, the traction control can be performed appropriately according to the vehicle's running state.

According to the present invention, a saddled vehicle's yaw rate is detected and a traction control is performed based on the yaw rate detected. As a result, the traction control can be performed appropriately according to the magnitude of the radius of curvature R of a curve. Consequently, the operation load imposed on a rider who is driving the vehicle around a curve can be further lightened.

Other features, elements, processes, steps, characteristics and advantages of the present invention will become more apparent from the following detailed description of preferred embodiments of the present invention with reference to the attached drawings.

Figure 4:
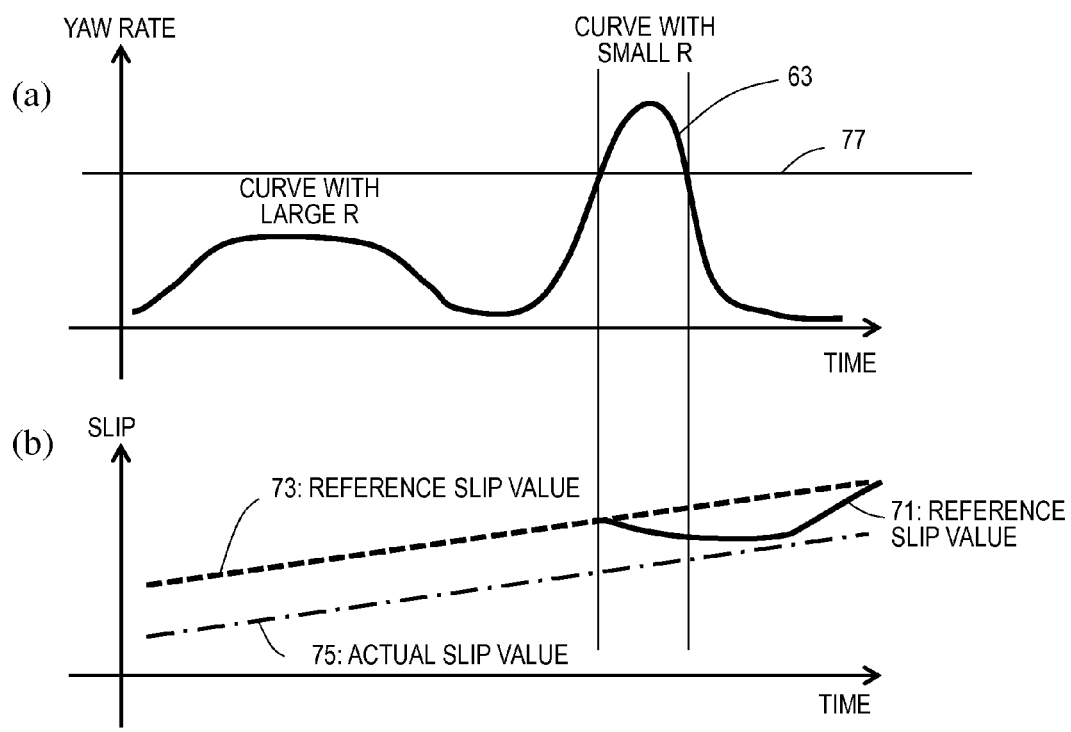

Portions (a) and (b) of FIG. 4 show the processing of changing the reference slip value according to yaw rate in an embodiment of the present invention.

Figure 5:
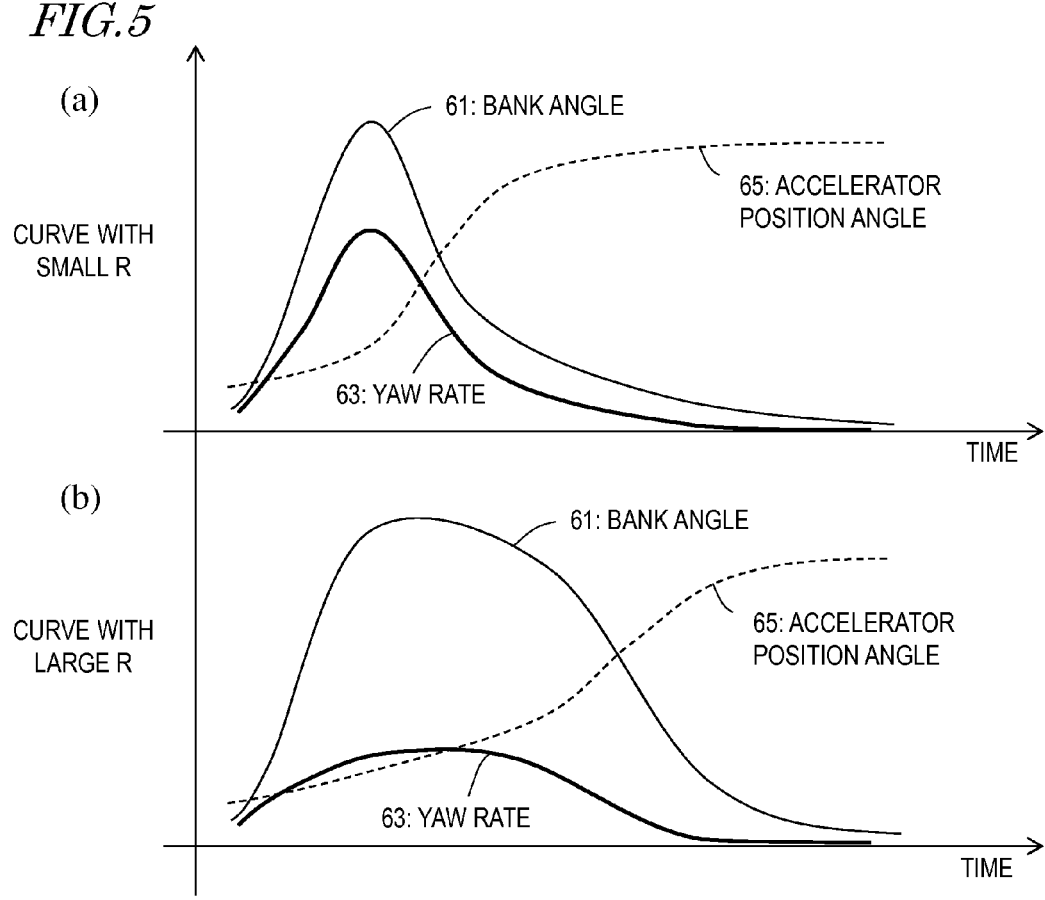

Portions (a) and (b) of FIG. 5 show the processing of changing the reference slip value according to yaw rate in an embodiment of the present invention.

Figure 6:
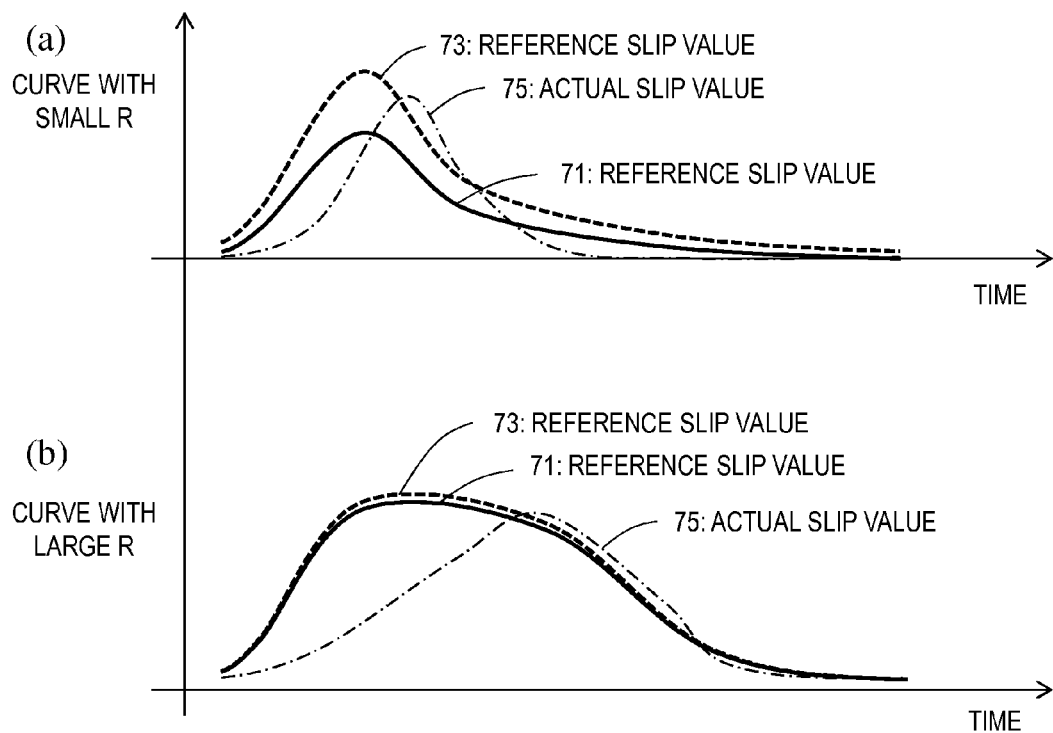

Portions (a) and (b) of FIG. 6 show the processing of changing the reference slip value according to yaw rate in an embodiment of the present invention.

Figure 7:
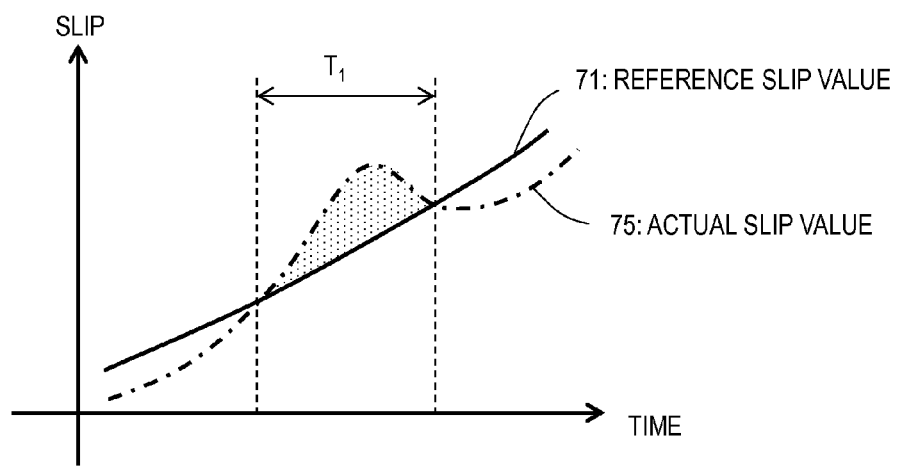

FIG. 7 shows a time period in which a traction control according to an embodiment of the present invention is performed.

Figure 8:
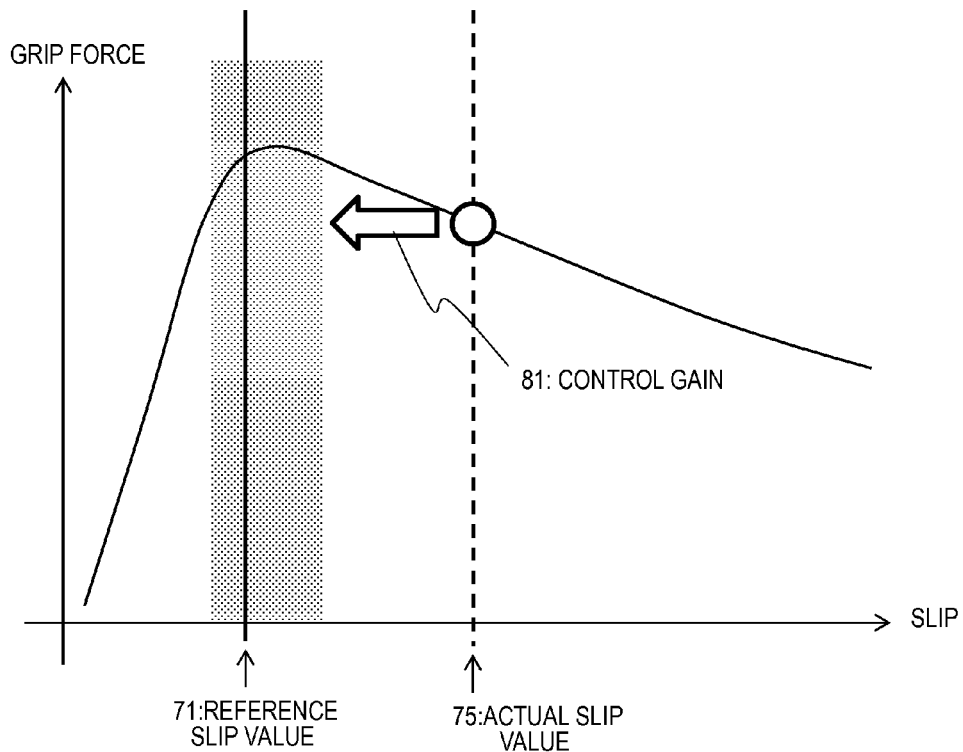

FIG. 8 shows how the processing of reducing the driving force is performed in an embodiment of the present invention.

Figure 9:
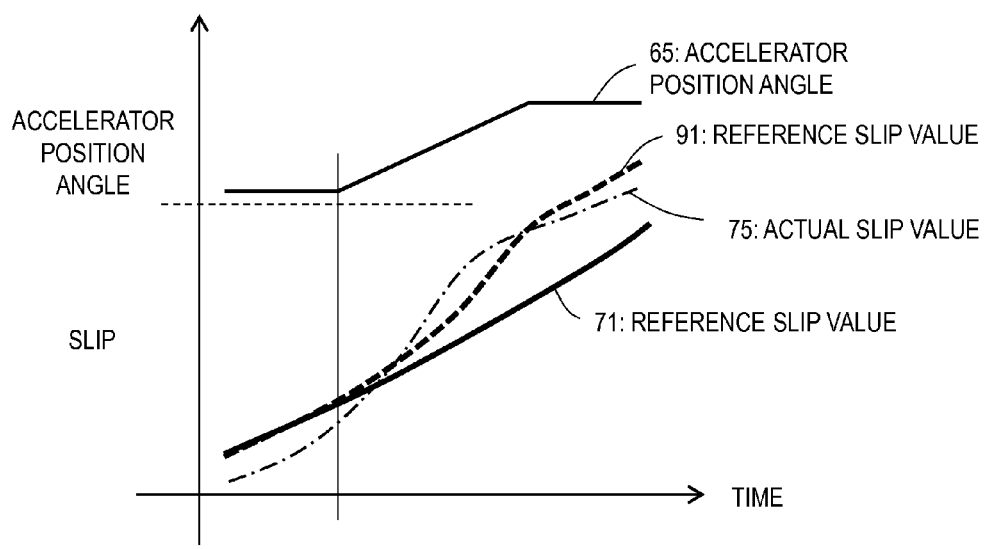

FIG. 9 shows the processing of changing the reference slip value according to accelerator position angle in an embodiment of the present invention.

DETAILED DESCRIPTION

Although motorcycles round curves of various dimensions, the magnitude of their bank angle while rounding a curve does not vary significantly according to the radius of curvature R of the curve. That is to say, motorcycles will round any curve at almost the same bank angle. When entering the latter half of a curve with a large radius of curvature R (such as a curve that requires high-speed cornering), the rider needs to accelerate the motorcycle in middle gear with the accelerator turned slowly and gently when the bank angle is still large. Since the accelerator is turned slowly and gently in such a situation, slipping, if any, does not tend to increase at so high a rate.

On the other hand, when entering the latter half of a curve with a small radius of curvature R (such as a hairpin curve that requires low-speed cornering), the rider needs to set the motorcycle upright quickly and change the accelerator position suddenly in low gear. As a result, in such a situation, slipping, if any, does tend to increase at a rather high rate. For that reason, when rounding such a curve with a small radius of curvature R, even if the bank angle is small, the slip value to be the threshold value at which the traction control is started is suitably decreased so that the traction control can be started readily.

A traction control system according to an embodiment of the present invention and a saddled vehicle including such a control system will now be described with reference to the accompanying drawings. In the following description, the present invention is supposed to be applied to a motorcycle.

The motorcycle to be described below includes an engine as a driving source and drives a single rear wheel. The motorcycle further includes a brake as a braking system to decrease the rotational velocity of the rear wheel. On the other hand, a front wheel of the motorcycle is a driven wheel to which no driving force is transmitted. A saddled vehicle includes at least one driving wheel and at least one front wheel. The driving source does not have to be an engine but may also be a motor or any other rotary power transfer device that rotates and drives the rear wheel. Also, in the following description, the front, rear, right and left will be defined with respect to the direction in which the motorcycle is heading.

Figure 1:
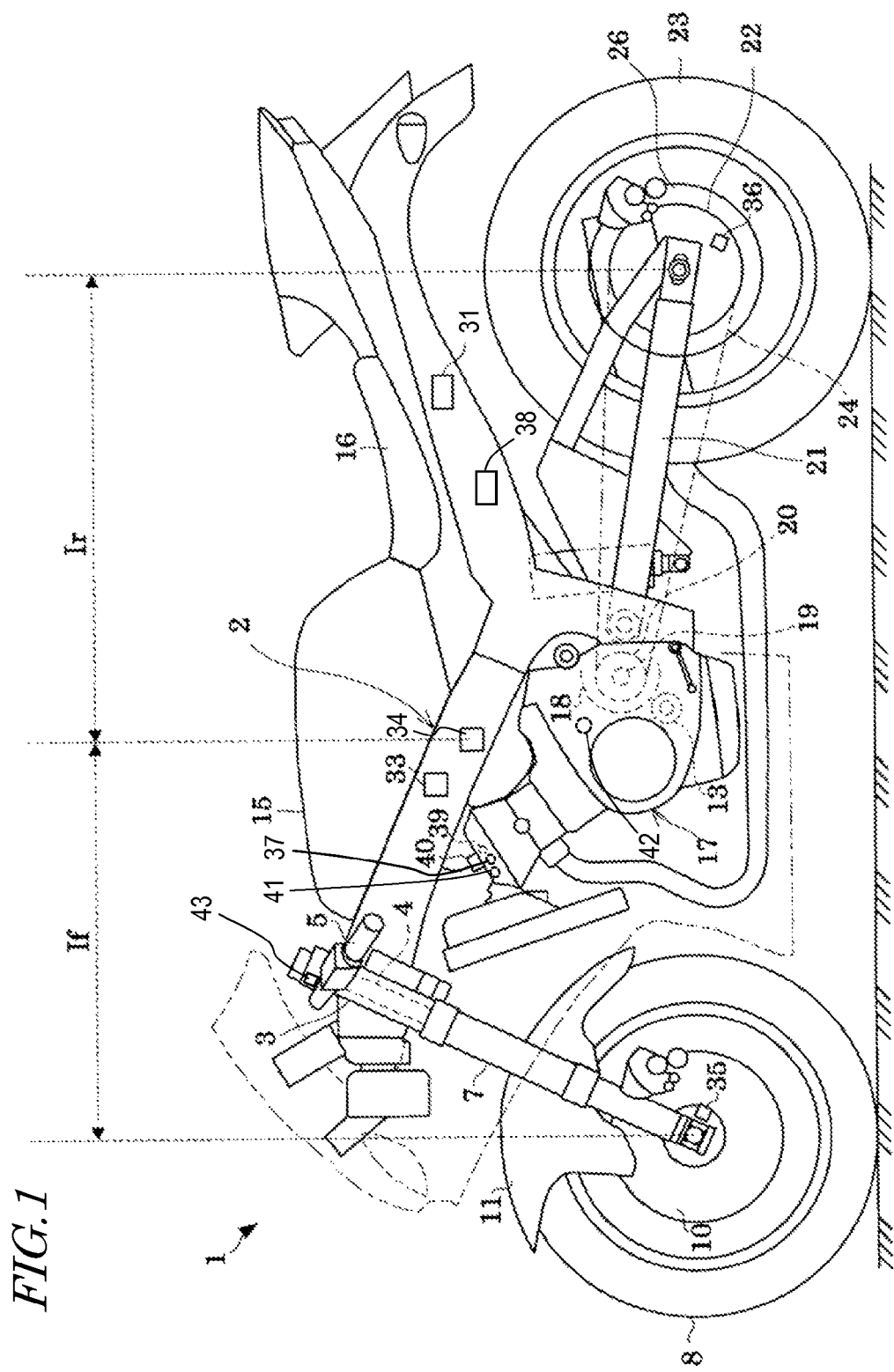
FIG. 1 is a side view illustrating a configuration for a motorcycle according to an embodiment of the present invention.

FIG. 1 is a side view illustrating a general configuration for a motorcycle 1 according to an embodiment of the present invention. This motorcycle 1 includes a main frame 2. A head pipe 3 is arranged to run through an upper part of the front end portion of the main frame 2. A steering shaft 4 is inserted into the head pipe 3. A pair of handlebars 5 is connected to the upper end portion of the steering shaft 4. On the right-hand side of one of the handlebars 5, arranged is a brake lever (not shown).

A pair of extendable and shrinkable front forks 7 are connected to the lower end portion of the steering shaft 4. Thus, by turning the handlebars 5, the front forks 7 swing. A front wheel 8 is attached rotatably to the lower end of the front forks 7. As the front forks 7 extend or shrink, the vibrations of the front wheel 8 are damped. A front wheel brake 10 is attached to the lower end of the front forks 7 so that the rider can brake the front wheel 8 rotating by turning the brake lever. In addition, a front wheel speed sensor 35 is also arranged near the lower end of the front forks 7 to detect and output the rotational velocity of the front wheel 8. A front fender 11 is secured to the front forks 7 over the front wheel 8.

On the main frame 2, a fuel tank 15 and a seat 16 are arranged in line along the main frame 2. Under the fuel tank 15, an engine 17 and a gearbox 18 are held by the main frame 2. The engine 17 is provided with a spark plug 39, a fuel injection system 40 and a throttle actuator 41. In addition, a throttle sensor 37 which detects and outputs the position of an electronic throttle valve (ETV) and a driving source rotating speed sensor 42 which detects and outputs the engine speed are also provided.

A clutch 13 is arranged between the engine 17 and the gearbox 18. The gearbox 18 has a drive shaft 19 which outputs the power that has been generated by the engine 17. A drive sprocket 20 is connected to the drive shaft 19. The power generated by the engine 17 is selectively output to the drive shaft 19 by engaging or disengaging the clutch 13. The gearbox 18 includes a plurality of gears, and changes the number of revolutions that have been transmitted from the engine 17 at one of multiple transmission gear ratios that has been selected, thereby rotating and driving the drive shaft 19.

A pair of swing arms 21 is supported under and behind the main frame 2 so as to swing toward any direction. At the rear end of the swing arms 21, a driven sprocket 22 and a rear wheel 23 are supported rotatably. A rear wheel speed sensor 36 which detects and outputs the rotational velocity of the rear wheel 23 is arranged near the driven sprocket 22. A rear wheel brake 26 which works by pumping a pedal brake (not shown) is provided for the rear wheel 23. A chain 24 is suspended between the drive sprocket 20 and the driven sprocket 22. The driving force generated by the engine 17 is transmitted to the rear wheel 23 via the clutch 13, gearbox 18, drive shaft 19, drive sprocket 20, chain 24 and driven sprocket 22.

Under the seat 16, arranged are a brake modulator 38 and an electronic control unit (ECU) 31 which controls the operations of respective parts of this motorcycle 1. The ECU 31 may be implemented as a combination of a microcomputer and a memory which stores a program defining the procedure of controlling the operations of respective parts of this motorcycle 1, for example.

The brake modulator 38 detects the braking pressures on the front and rear wheel brakes 10 and 26 (i.e., the magnitude of the braking force), and adjusts the braking pressures on the front and rear wheel brakes 10 and 26 in response to operations on the brake lever and the brake pedal.

This motorcycle 1 further includes a gyroscope (a yaw rate detector) 33 and an acceleration sensor 34 and detects the bank angle of this vehicle using the gyroscope 33 and the acceleration sensor 34. Optionally, the motorcycle 1 may include a hexaxial inertial measurement unit as the gyroscope 33 and acceleration sensor 34.

Figure 2:
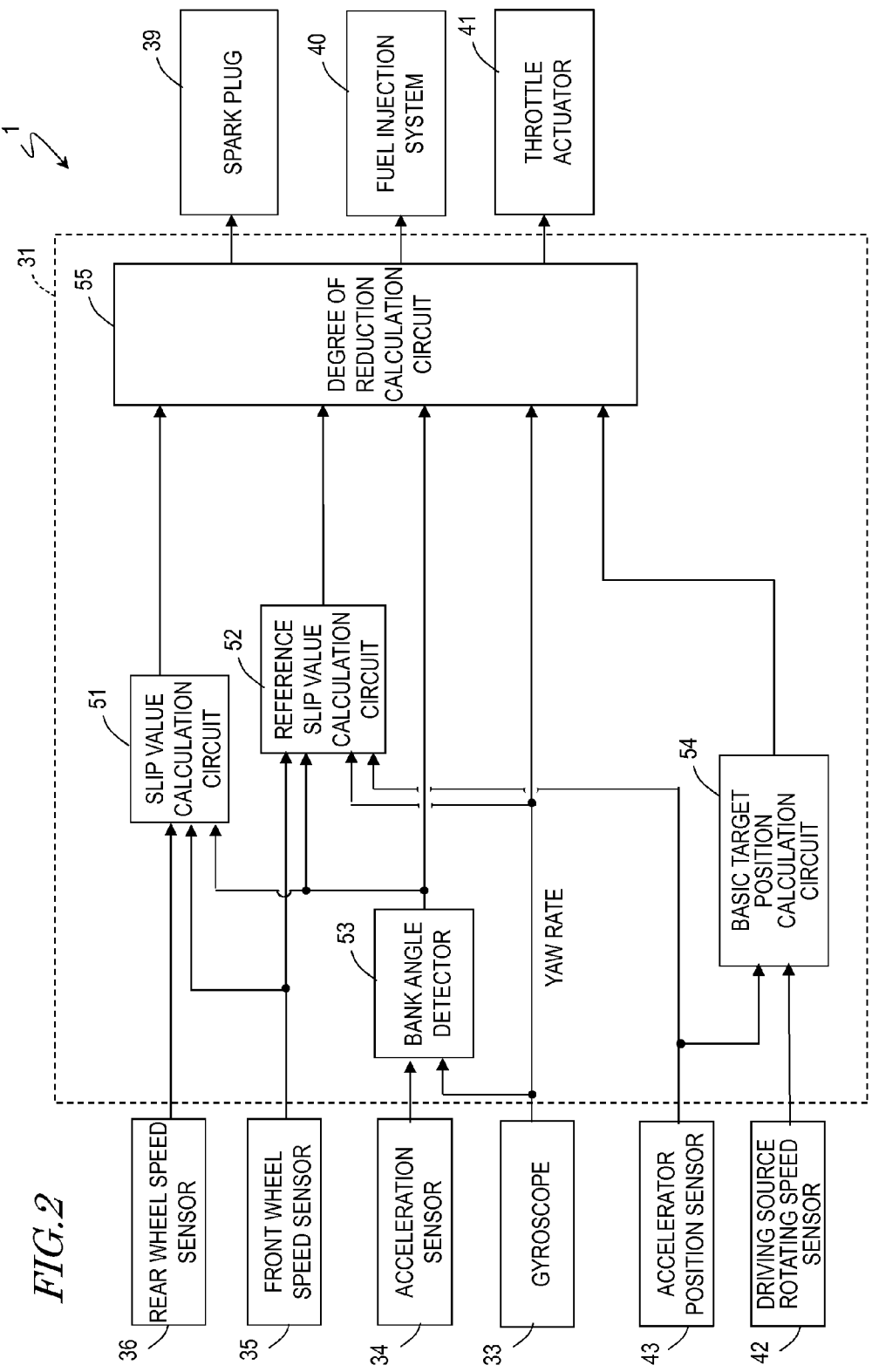
FIG. 2 is a functional block diagram of an ECU 31 which performs a traction control according to an embodiment of the present invention.

FIG. 2 is a functional block diagram of the ECU 31 that performs a traction control. According to the traction control of this embodiment, the magnitude of slipping of the rear wheel is calculated by subtracting the rotational velocity [km/h] of the rear wheel from that of the front wheel, and a reference slip value to be a threshold value at which the driving force reduction control is started is also calculated, thereby determining, based on these values, whether the traction control should be turned ON or OFF and how much the driving force should be reduced.

The ECU 31 includes a slip value calculation circuit 51, a reference slip value calculation circuit 52, a bank angle detector 53, a basic target position calculation circuit 54, and a degree of reduction calculation circuit 55. The functions of these components can be carried out by making a microcomputer retrieve and execute a program that is stored in a memory. Optionally, the ECU 31 may also have the function of controlling the respective parts of the motorcycle 1 in addition to these components. Alternatively, at least some of these components of the ECU 31 may be included in a different control unit from the ECU 31.

The front wheel speed sensor 35 detects the rotational velocity of the front wheel 8 and outputs it to the slip value calculation circuit 51 and the reference slip value calculation circuit 52. The rear wheel speed sensor 36 detects the rotational velocity of the rear wheel 23 and outputs it to the slip value calculation circuit 51.

The acceleration sensor 34 detects acceleration on this motorcycle 1 and outputs it to the bank angle detector 53. The gyroscope 33 detects the angular velocity and yaw rate of the motorcycle 1 and outputs them to the bank angle detector 53, reference slip value calculation circuit 52 and degree of reduction calculation circuit 55. The bank angle detector 53 detects the bank angle of the motorcycle 1 based on the acceleration and the angular velocity. A known method may be used to obtain the bank angle based on the acceleration and/or angular velocity, and detailed description thereof will be omitted herein. Also, as long as the bank angle can be obtained, parameters other than the acceleration and angular velocity may also be used to calculate the bank angle. The bank angle detector 53 outputs the bank angle detected to the slip value calculation circuit 51, reference slip value calculation circuit 52 and degree of reduction calculation circuit 55.

The acceleration position sensor 43 detects the accelerator position angle that changes as the rider twists the accelerator grip, and outputs it to the basic target position calculation circuit 54 and reference slip value calculation circuit 52. The driving source rotating speed sensor 42 detects the speed of the engine 17 and outputs it to the basic target position calculation circuit 54. In response, the basic target position calculation circuit 54 defines an accelerator-throttle characteristic, representing how the throttle position angle changes with the accelerator position angle, based on the accelerator position angle and the speed of the engine 17. The accelerator-throttle characteristic defined by the basic target position calculation circuit 54 may be a characteristic when the motorcycle 1 is going straight (or standing upright), for example.

The slip value calculation circuit 51 calculates the current slip value of the rear wheel 23 based on the difference in velocity between the front and rear wheels and the bank angle. The reference slip value calculation circuit 52 calculates a reference slip value to be a threshold value at which the traction control is turned ON and OFF based on the rotational velocity of the front wheel 8, the yaw rate and the accelerator position angle. For example, if the bank angle is large, the magnitude of permissible slipping is small, and therefore, the threshold slip value is set to be low enough to perform the traction control easily. On the other hand, if the bank angle is small, the magnitude of permissible slipping is large, and therefore, the threshold slip value is set to be too high to perform the traction control easily. Also, if the yaw rate is large, the magnitude of permissible slipping is small, and therefore, the reference slip value is set to be low enough to perform the traction control easily. On the other hand, if the yaw rate is small, the magnitude of permissible slipping is large, and therefore, the threshold slip value is set to be too high to perform the traction control easily. Such processing of changing the reference slip value according to yaw rate will be described in detail later.

The degree of reduction calculation circuit 55 compares the current slip value of the rear wheel 23 and the reference slip value to be the threshold value to each other, and gets the traction control started if the current slip value of the rear wheel 23 turns out to be equal to or greater than the reference slip value. In this case, the larger the slip value of the rear wheel 23, the more significantly the driving force should be reduced. For example, if the current slip value of the rear wheel 23 is far greater than the reference slip value, the degree of reduction is increased. On the other hand, if the current slip value of the rear wheel 23 is less than the reference slip value, then no traction control is performed. Also, the driving force is reduced more significantly if the yaw rate is large but less significantly if the yaw rate is small, for example. Such processing of changing the degree of reduction according to yaw rate will be described in detail later.

When the traction control is performed, the degree of reduction calculation circuit 55 controls the degree of reduction of the driving force by adjusting the ignition time lag of the spark plug 39, for example. Also, the degree of reduction calculation circuit 55 controls the degree of reduction of the driving force by adjusting the injection rate of the fuel injection system 40, for example. Alternatively, the degree of reduction of the driving force may also be controlled using the rear wheel brake, for example. Still alternatively, the degree of reduction of the driving force may also be controlled by adjusting the throttle position angle of the throttle actuator 41. In this case, by reference to the accelerator-throttle characteristic provided by the basic target position calculation circuit 54, the accelerator-throttle characteristic is changed and the throttle actuator 41 is controlled.

Next, it will be described in detail how to change the reference slip value and the degree of reduction of the driving force according to yaw rate.

Figure 3:
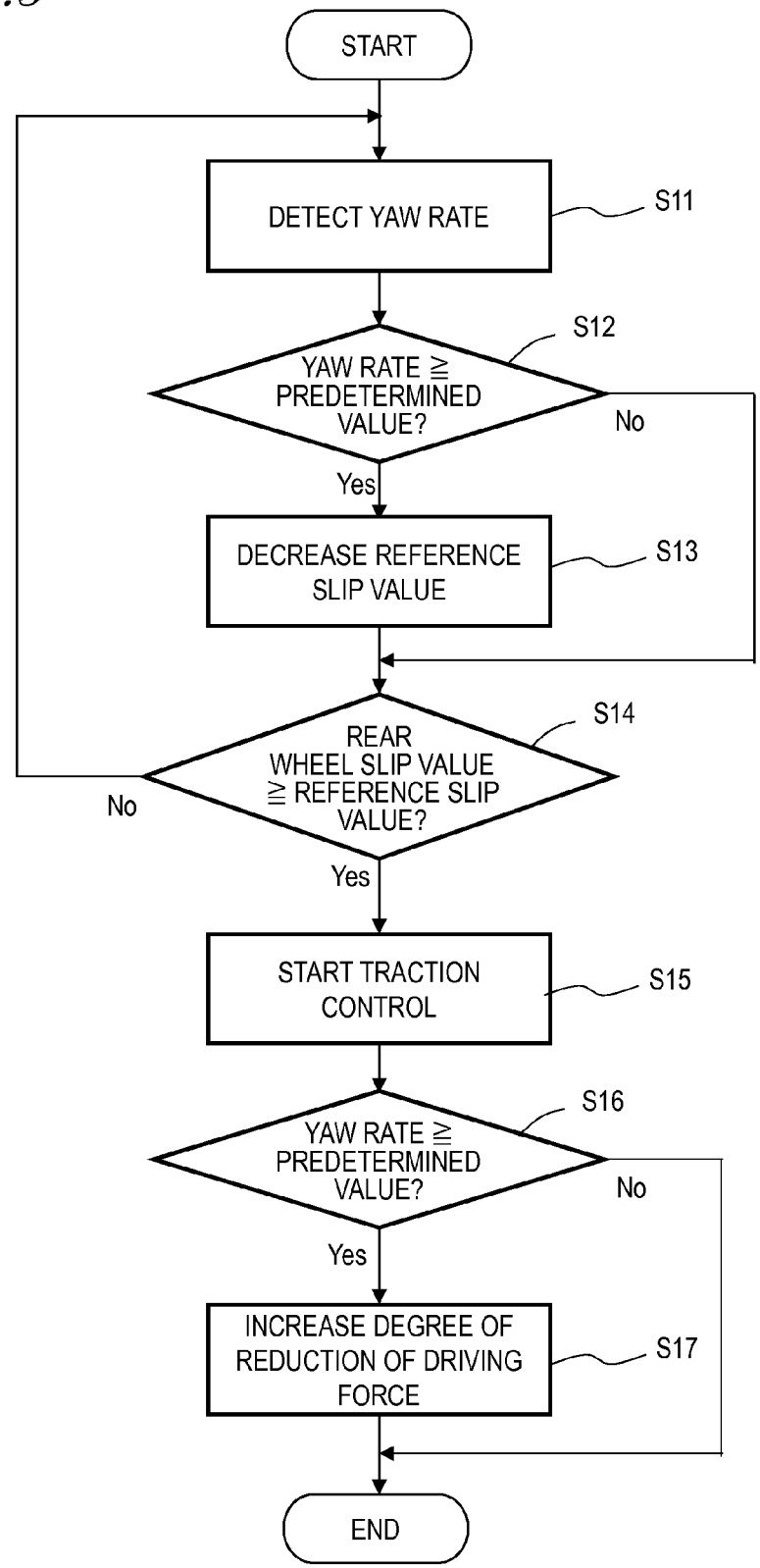
FIG. 3 is a flowchart showing the procedure of processing of changing a reference slip value and the degree of reduction of driving force according to yaw rate in an embodiment of the present invention.

FIG. 3 is a flowchart showing the procedure of processing of changing the reference slip value and the degree of reduction of the driving force according to yaw rate. FIGS. 4 to 6 illustrate the processing of changing the reference slip value according to yaw rate. FIGS. 7 and 8 illustrate the processing of reducing the driving force according to yaw rate.

Portion (a) of FIG. 4 shows how the yaw rate changes with the radius of curvature R of a curve. Portion (b) of FIG. 4 shows the processing of changing the reference slip value according to yaw rate. Portion (a) of FIG. 5 shows how the bank angle 61, yaw rate 63 and accelerator position angle 65 change when the motorcycle is rounding a curve with a small radius of curvature R. Portion (b) of FIG. 5 shows how the bank angle 61, yaw rate 63 and accelerator position angle 65 change when the motorcycle is rounding a curve with a large radius of curvature R. Portion (a) of FIG. 6 shows how the reference slip values 71, 73 and actual slip value 75 change when the motorcycle is rounding a curve with a small radius of curvature R. And portion (b) of FIG. 6 shows how the reference slip values 71, 73 and actual slip value 75 change when the motorcycle is rounding a curve with a large radius of curvature R.

The gyroscope 33 detects the yaw rate of the motorcycle 1 and outputs it to the reference slip value calculation circuit 52 (in Step S11 shown in FIG. 3). As shown in FIGS. 4 and 5, when rounding a curve with a large radius of curvature R (such as a curve that requires high speed cornering), the motorcycle 1 changes its orientation so slowly and gently that the yaw rate 63 detected becomes small. On the other hand, when rounding a curve with a small radius of curvature R (such as a hairpin curve that requires low speed cornering), the motorcycle 1 changes its orientation so rapidly and steeply that the yaw rate 63 detected becomes large. That is to say, the radius of curvature R of the curve that the motorcycle 1 is rounding can be seen by detecting the yaw rate.

When rounding a curve with a large radius of curvature R, the rider needs to accelerate the motorcycle in middle gear with the accelerator turned slowly and gently when the bank angle 61 is still large. Since the accelerator position angle 65 changes slowly and gently in such a situation, slipping, if any, does not tend to increase at so high a rate. That is why if the yaw rate 63 is small, the reference slip value calculation circuit 52 sets a reference slip value 73 based on parameters other than the yaw rate. On the other hand, when rounding a curve with a small radius of curvature R, the rider needs to set the motorcycle upright quickly and change the accelerator position suddenly in low gear. As a result, in such a situation, slipping, if any, does tend to increase at a rather high rate. For that reason, when rounding such a curve with a small radius of curvature R, even if the bank angle is small, the slip value to be the threshold value at which the traction control is started is suitably decreased so that the traction control can be started readily. That is why if the yaw rate 63 is large, the reference slip value calculation circuit 52 sets a reference slip value 71 to be smaller than the reference slip value 73 based on the magnitude of the yaw rate 63 (in Steps S12 and S13). For example, once the yaw rate 63 has reached and exceeded a predetermined value 77, the reference slip value is gradually lowered. And when the motorcycle has rounded the curve, the reference slip value will be restored to the original level as shown in FIGS. 4 and 6.

The degree of reduction calculation circuit 55 compares the current slip value 75 of the rear wheel 23 to a preset reference slip value, and gets the traction control started if the actual slip value 75 turns out to be equal to or greater than the reference slip value (in Steps S14 and S15). On the other hand, if the actual slip value 75 turns out to be less than the reference slip value, the traction control is not started but the processing of detecting the yaw rate and setting the reference slip value is continued.

As shown in FIG. 5, when the motorcycle is rounding a curve, the magnitude of the bank angle 61 is almost the same, irrespective of the radius of curvature R of that curve. That is to say, the motorcycle will round any curve at almost the same bank angle 61. That is why if the reference slip value is just decreased when the bank angle is large and just increased when the bank angle is small, slipping, if any, tends to increase at a rather high rate at a curve with a small radius of curvature R as described above. That is why according to this embodiment, by setting the reference slip value to be low enough to perform the traction control easily when the motorcycle is rounding a curve with such a small radius of curvature R, the rider can set the vehicle upright quickly in low gear. In addition, even if he or she changes the accelerator position suddenly, it is still possible to prevent the rate of increase in slipping from going too high.

In the example shown in portion (b) of FIG. 4, when the motorcycle is rounding a curve with a large radius of curvature R, the slip value is set to be the reference slip value 73. However, the slip value may also be set to be the decreased reference slip value 71 as shown in portion (b) of FIG. 6. Even so, by setting the reference slip value 71 when the radius of curvature R is small to be smaller than the reference slip value 73 when the radius of curvature R is large as shown in portions (a) and (b) of FIG. 6, it is still possible to prevent the rate of increase in slipping from going too high.

Next, the processing of changing the control gain (i.e., the degree of reduction of the driving force) according to yaw rate is performed. FIG. 7 shows a time period $T_1$ in which the traction control is performed. FIG. 8 shows how the processing of reducing the driving force is performed in the time period $T_1$ in which the traction control is performed.

The reference slip value described above determines the timing to start the traction control. If the timing of control is accelerated, slipping can be reduced more significantly. Also, since the magnitude of slipping at which the rider wants to get the traction control started varies according to his or her skill, such rider's needs may be met by adjusting the reference slip value. The control gain determines how much slipping, of which the magnitude exceeds the reference slip value, should be controlled (i.e., how much the driving force should be reduced). If the control gain is increased, the actual slip value will converge toward the reference slip value more easily. On the other hand, if the control gain is decreased, then the rider will find the traction control interfering with his or her driving just modestly. In both of the reference slip value and the control gain, the rider's needs vary according to the running state. That is why to meet his or her needs, not only the reference slip value but also the control gain are suitably adjusted according to bank angle and/or yaw rate.

The traction control is performed in the time period $T_1$ in which the actual slip value 75 is equal to or greater than the reference slip value 71 as shown in FIG. 7. In the shadowed range shown in FIG. 8, high grip force is applied onto the rear wheel 23. Although it depends on the rider's skill how much grip force is preferred, the motorcycle suitably runs in such a high grip force range in order to accelerate the motorcycle efficiently. That is why the reference slip value 71 is suitably set within the high grip force range and the driving force is suitably reduced to maintain such a slip value falling within that range.

As described above, when rounding a curve with a large radius of curvature R, the rider needs to accelerate the motorcycle in middle gear with the accelerator turned slowly and gently when the bank angle is still large. Thus, slipping, if any, does not tend to increase at so high a rate. That is why if the yaw rate is small (i.e., less than a predetermined value), the degree of reduction calculation circuit 55 sets the control gain 81 based on parameters other than the yaw rate. On the other hand, when rounding a curve with a small radius of curvature R, the rider needs to set the motorcycle upright quickly and change the accelerator position suddenly in low gear. As a result, in such a situation, slipping, if any, does tend to increase at a rather high rate. For that reason, if the yaw rate is large (i.e., equal to or greater than a predetermined value), the degree of reduction calculation circuit 55 increases the control gain 81 so that the actual slip value 75 can get closer to the reference slip value 71 quickly (in Steps S16 and S17).

In this case, if the control gain is increased more significantly as the excess of the actual slip value 75 over the reference slip value increases, the actual slip value 75 can get closer to the reference slip value 71 more quickly.

In addition, since the permissible slip value varies according to the bank angle of the motorcycle 1, the control gain is suitably changed according to the bank angle. By changing the timing to start the traction control according to bank angle, slipping can be reduced. However, if the control gain remained the same no matter whether the bank angle is large or small, the degree of reduction could be insufficient when the bank angle is large and could be excessive when the bank angle is small. That is why if the control gain is increased when the bank angle is large and decreased when the bank angle is small, the traction control can be performed adaptively to the running state.

Next, the processing of changing the reference slip value according to accelerator position angle will be described. FIG. 9 shows such processing of changing the reference slip value according to accelerator position angle. By reducing slipping through the traction control, no slipping exceeding a certain level will occur anymore. However, if the rider wants to drive the motorcycle while sliding the rear wheel 23, he or she will find such an excessive traction control uncomfortable and will not feel fine when driving his or her motorcycle. In addition, in such a situation, even if the rider turns the accelerator significantly, he or she will find the motorcycle accelerating too slowly and will not feel fine, either. That is why to meet such rider's needs and eliminate such uncomfortableness, the reference slip value is changed in this example according to accelerator position angle.

First of all, the reference slip value calculation circuit 52 sets a reference slip value 71 and reduces slipping through the traction control. However, as the accelerator position angle 65 increases, the reference slip value calculation circuit 52 sets a reference slip value 91 which is larger than the reference slip value 71. Also, as the accelerator position angle 65 increases, the reference slip value 91 may also be increased. By changing the reference slip value according to accelerator position angle in this manner, the traction control can be performed with the rider's needs to drive the motorcycle while sliding the rear wheel 23 satisfied.

It should be noted that the control operation that has been described in the foregoing description of embodiments may be implemented by hardware circuits, software program, or a combination thereof. A computer program which is defined to perform the operations may be stored in a memory provided for the ECU 31, for example, and the operation is carried out by the ECU 31 (that is a computer). Also, such a computer program may be installed from a storage medium (like a semiconductor memory or an optical disc) on which the program is stored into the motorcycle 1 or downloaded through the Internet or any other telecommunications lines. Alternatively, such a computer program may be installed into the motorcycle 1 via wireless communication. In some embodiments, ECU 31 may be stored in a non-transitory, tangible computer readable storage medium on the motorcycle 1 so that the computer program may be stored in a storage medium such as a non-transitory, tangible computer readable storage medium. ECU 31 may also be implemented by a processor or processors.

Although the magnitude of slipping is supposed to be used in the traction control described above, a slipping ratio (which is calculated by rear wheel's number of revolutions/front wheel's number of revolutions−1×100 [%]) may also be used. Also, the engine's driving force may be reduced by not only controlling the injection rate of the fuel injection system 40 but also using the rear wheel's brake as well.

The present invention can be used particularly effectively for a vehicle which banks while rounding a curve.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Application No. 2014-179160 filed on Sep. 3, 2014, the entire contents of which are hereby incorporated by reference.

What is claimed is:

1. A traction control system comprising:
   a yaw rate sensor configured to detect a yaw rate of a saddled vehicle, the yaw rate sensor detecting the detected yaw rate to be
      a first yaw rate value when the saddled vehicle is rounding a first curve, and
      a second yaw rate value when the saddled vehicle is rounding a second curve that is different from the first curve, the first yaw rate value being larger than the second yaw rate value; and
   a microcomputer configured to perform a traction control of the saddled vehicle based on the detected yaw rate, the microcomputer changing a threshold slip value, at which the traction control is turned ON and OFF, according to the detected yaw rate so that the threshold slip value is decreased when the first yaw rate value is detected, compared to when the second yaw rate value is detected.

2. The traction control system of claim 1, wherein the microcomputer detects a slip value of the saddled vehicle's rear wheel, and
   the microcomputer is responsive to the detected rear wheel's slip value being equal to or greater than the threshold slip value, so that the microcomputer starts to perform the traction control.

3. The traction control system of claim 1, further comprising an accelerator position angle detector configured to detect an accelerator position angle of an accelerator of the saddled vehicle,
   wherein the microcomputer changes the threshold slip value according to the detected accelerator position angle.

4. The traction control system of claim 3, wherein the microcomputer is responsive to the detected accelerator position angle being a first value, so that the microcomputer increases the threshold slip value, compared to when the detected accelerator position angle is at a second value smaller than the first value.

5. The traction control system of claim 1, wherein the microcomputer reduces a driving force of the vehicle through the traction control to a varying degree according to the detected yaw rate.

6. The traction control system of claim 5, wherein the microcomputer is responsive to the detected yaw rate being at the first yaw rate value, so that the microcomputer reduces the driving force more significantly than when the detected yaw rate is at the second raw rate value.

7. The traction control system of claim 5, wherein the microcomputer detects a slip value of the saddled vehicle's rear wheel, and
   the microcomputer reduces the driving force through the traction control to a varying degree further according to the detected rear wheel's slip value.

8. The traction control system of claim 7, wherein the microcomputer is responsive to the detected rear wheel's slip value detected being at a first value, so that the microcomputer reduces the driving force more significantly than when the detected rear wheel's slip value is at a second value smaller than the first value.

9. The traction control system of claim 1, further comprising a bank angle detector configured to detect the saddled vehicle's bank angle,
   wherein the microcomputer reduces a driving force of the saddled vehicle through the traction control to a varying degree according to the detected bank angle.

10. The traction control system of claim 9, wherein the microcomputer is responsive to the detected bank angle being at a first value, so that the microcomputer reduces the driving force more significantly than when detected the bank angle is a second value smaller than the first value.

11. A saddled vehicle comprising the traction control system of claim 1.

12. The traction control system of claim 1, wherein the microcomputer changes the threshold slip value, above which the traction control is ON and below which the traction control is OFF, according to the detected yaw rate so that when the detected yaw rate is above a predetermined value, the threshold slip value decreases.

13. The traction control system of claim 12, wherein the microcomputer compares a current slip value of a wheel of the saddled vehicle to the threshold slip value to determine if the traction control is to be turned ON and OFF so that if the current slip value is above or equal to the threshold slip value, the traction control is ON, and if the current slip value is below the threshold slip value, the traction control is OFF.

14. The traction control system of claim 12, wherein the microcomputer is responsive to the detected yaw rate being above or greater than a predetermined yaw rate value so that a degree of reduction of a drive force of the saddled vehicle, through the traction control, is greater than when the detected yaw rate is below the predetermined yaw rate value.

15. The traction control system of claim 1, further comprising a non-transitory, tangible computer readable storage medium storing the microcomputer.

16. The traction control system of claim 1, wherein the traction control system reduces a driving force of the vehicle so that slipping of a rear wheel of the vehicle is reduced.

17. The traction control system of claim 1, wherein a first radius of curvature of the first curve is smaller than a second radius of curvature of the second curve.

18. A non-transitory computer readable medium storing a computer program which is defined to make a computer perform a traction control on a saddled vehicle, the program being defined to make the computer perform the steps of:
  detecting the saddled vehicle's yaw rate, the detected yaw rate being
    a first yaw rate value when the saddled vehicle is rounding a first curve, and
    a second yaw rate value when the saddled vehicle is rounding a second curve that is different from the first curve, the first yaw rate value being larger than the second yaw rate value;
  performing the traction control according to the detected yaw rate; and
  changing a threshold slip value, at which the traction control is turned ON and OFF, according to the detected yaw rate so that the threshold slip value is decreased when the first yaw rate value is detected, compared to when the second yaw rate value is detected.

19. The non-transitory computer readable medium of claim 18, wherein a first radius of curvature of the first curve is smaller than a second radius of curvature of the second curve.

* * * * *